United States Patent
Kim et al.

(10) Patent No.: US 11,653,113 B2
(45) Date of Patent: May 16, 2023

(54) IMAGE SENSOR HAVING IMPROVED EFFICIENCY BY REDUCING NOISE AND TIME TAKEN FOR CAPTURING IMAGE

(71) Applicant: SAMSUNG ELECTRONICS CO., LTD., Suwon-si (KR)

(72) Inventors: Moo Young Kim, Suwon-si (KR); Hyeok Jong Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/001,053

(22) Filed: Aug. 24, 2020

(65) Prior Publication Data

US 2020/0389610 A1    Dec. 10, 2020

Related U.S. Application Data

(63) Continuation of application No. 16/530,583, filed on Aug. 2, 2019, now Pat. No. 10,785,429.

(30) Foreign Application Priority Data

Jan. 18, 2019    (KR) .......................... 10-2019-0006557

(51) Int. Cl.
   *H04N 5/357*    (2011.01)
   *H04N 5/376*    (2011.01)

(52) U.S. Cl.
   CPC ......... *H04N 5/3575* (2013.01); *H04N 5/3765* (2013.01)

(58) Field of Classification Search
   CPC .... H04N 5/3575; H04N 5/3765; H04N 5/378; H04N 5/341; H04N 5/3559; H04N 5/3741
   See application file for complete search history.

(56) References Cited

U.S. PATENT DOCUMENTS

| 7,995,123 B2 | 8/2011 | Lee et al. |
| 9,225,923 B2 | 12/2015 | Hashimoto et al. |

(Continued)

FOREIGN PATENT DOCUMENTS

| JP | 2018-74311 A | 5/2018 |
| KR | 10-2016-0145217 A | 12/2016 |
| KR | 10-2016-0150523 A | 12/2016 |

OTHER PUBLICATIONS

Communication dated Jul. 11, 2022 issued by the Korean Intellectual Property Office in counterpart Korean Application No. 10-2019-0006557.

*Primary Examiner* — Luong T Nguyen
(74) *Attorney, Agent, or Firm* — Sughrue Mion, PLLC

(57) ABSTRACT

An image sensor includes a pixel including a reset circuit and a floating diffusion node, and outputting a pixel signal that is generated based on a voltage at the floating diffusion node, the pixel signal including a reset output that is generated based on the voltage at the floating diffusion node being reset by the reset circuit. The image sensor further includes a sampler sampling the output pixel signal to generate a sampling signal having a time interval corresponding to a magnitude of the output pixel signal, and a counter counting the generated sampling signal, based on a counter clock, to generate a counting value corresponding to the time interval of the sampling signal. The sampler samples the reset output of the output pixel signal n times to generate first to n-th reset sampling signals, where n is an integer of 2 or more.

20 Claims, 16 Drawing Sheets

(56) References Cited

U.S. PATENT DOCUMENTS

| | | |
|---|---|---|
| 9,232,161 B2 * | 1/2016 | Suh ........................ H04N 5/378 |
| 9,554,013 B2 | 1/2017 | Kim et al. |
| 9,554,075 B2 | 1/2017 | Kishi |
| 9,667,893 B2 * | 5/2017 | Kimura .................. H04N 5/363 |
| 9,706,145 B2 | 7/2017 | Ishiwata |
| 9,860,460 B2 | 1/2018 | Kim et al. |
| 9,961,282 B2 | 5/2018 | Yamazaki |
| 10,397,508 B2 | 8/2019 | Lee et al. |
| 2011/0037868 A1 | 2/2011 | Ota |
| 2014/0340555 A1 * | 11/2014 | Iwane .................... H04N 5/378 348/308 |
| 2015/0296156 A1 * | 10/2015 | Shin .................. H04N 9/04557 348/272 |
| 2015/0304586 A1 * | 10/2015 | Kishi .................. H04N 5/3575 348/302 |
| 2017/0272675 A1 * | 9/2017 | Kobayashi ......... H04N 5/37457 |
| 2017/0310878 A1 * | 10/2017 | Mochizuki ......... H04N 5/36961 |
| 2018/0205897 A1 | 7/2018 | Kim et al. |

* cited by examiner

FIG. 1A

Multi-sampling of related art

|        | double PD noise         | single PD noise         | Time consumption |
|--------|-------------------------|-------------------------|------------------|
| Normal | $N_{double}$            | $N_{single}$            | T                |
| LN2    | $1/\sqrt{2}\, N_{double}$ | $1/\sqrt{2}\, N_{single}$ | 2T               |
| LN4    | $1/\sqrt{4}\, N_{double}$ | $1/\sqrt{4}\, N_{single}$ | 4T               |

FIG. 1B

Multi-sampling of present disclosure

|        | double PD noise         | single PD noise | Time consumption |
|--------|-------------------------|-----------------|------------------|
| Normal | $N_{double}$            | $N_{single}$    | T                |
| LN2    | $1/\sqrt{2}\, N_{double}$ | $N_{single}$    | 1.6T             |
| LN4    | $1/\sqrt{4}\, N_{double}$ | $N_{single}$    | 2.8T             |

IMAGE SENSOR HAVING IMPROVED EFFICIENCY BY REDUCING NOISE AND TIME TAKEN FOR CAPTURING IMAGE

CROSS-REFERENCE TO THE RELATED APPLICATION

This is a continuation application of U.S. patent application Ser. No. 16/530,583, filed Aug. 2, 2019, in the U.S. Patent and Trademark Office, which claims priority from Korean Patent Application No. 10-2019-0006557, filed on Jan. 18, 2019, in the Korean Intellectual Property Office, the disclosure of which is incorporated herein by reference in its entirety.

BACKGROUND

1. Field

Apparatuses consistent with embodiments relate to an image sensor.

2. Description of the Related Art

An image sensor of a semiconductor device is an element that converts an optical image into an electric signal. The image sensor may be classified into a CCD (charge coupled device) type and a CMOS (complementary metal oxide semiconductor) type. The CMOS type image sensor is abbreviated as a CIS (CMOS image sensor). The CIS includes a plurality of pixels arranged two-dimensionally. Each of the pixels includes a photodiode (PD). The photodiode serves to convert the incident light into an electric signal.

As a method for reducing the noise of the image sensor, a multi-sampling technique may be used. However, when the image sensor uses the multi-sampling technique, the time taken for capturing the image may become longer.

Recently, with the development of the computer industry and communication industry, demands for the image sensors with improved performance has increased in various fields such as a digital camera, a video camera, a PCS (Personal Communication System), a game machine, a security camera, a medical micro camera, and a robot. Further, as the semiconductor devices are highly integrated, the image sensors are also highly integrated.

SUMMARY

According to embodiments, there is provided an image sensor including a pixel including a reset circuit and a floating diffusion node, and outputting a pixel signal that is generated based on a voltage at the floating diffusion node, the pixel signal including a reset output that is generated based on the voltage at the floating diffusion node being reset by the reset circuit. The image sensor further includes a sampler sampling the output pixel signal to generate a sampling signal having a time interval corresponding to a magnitude of the output pixel signal, and a counter counting the generated sampling signal, based on a counter clock, to generate a counting value corresponding to the time interval of the sampling signal. The sampler samples the reset output of the output pixel signal n times to generate first to n-th reset sampling signals, where n is an integer of 2 or more, and the counter stores, in a first memory, a first reset counting value that is generated by counting a first reset sampling signal among the generated first to n-th reset sampling signals, and stores, in a second memory different from the first memory, a second reset counting value that is generated by sequentially counting the generated first to n-th reset sampling signals.

According to embodiments, there is provided an image sensor including a pixel including a first photoelectric element and a second photoelectric element, and outputting a pixel signal including a reset output, a single photodiode (PD) output, and a double PD output, the single PD output being generated based on the first photoelectric element, and the double PD output being generated based on the first photoelectric element and the second photoelectric element. The image sensor further includes a sampler sampling the output pixel signal, based on a sampling start signal, to generate a sampling signal, and a counter counting the generated sampling signal, based on a counter clock, to generate a counting value corresponding to a time interval of the sampling signal. The sampler samples the reset output of the output pixel signal n times to generate first to n-th reset sampling signals, samples the single PD output of the output pixel signal once to generate a single PD sampling signal, and samples the double PD output of the output pixel signal the n times to generate first to n-th double PD sampling signals, where n is an integer of 2 or more. The counter down-counts a first reset sampling signal among the generated first to n-th reset sampling signals, to generate a first reset counting value, and up-counts the generated single PD sampling signal from the generated first reset counting value, to generate a single PD digital value.

According to embodiments, there is provided an image sensor including a pixel array including a pixel outputting a pixel signal, the pixel including a first photoelectric element and a second photoelectric element, a first transmission transistor connected to the first photoelectric element, a second transmission transistor connected to the second photoelectric element, a floating diffusion node at which the first transmission transistor and the second transmission transistor are connected, a constant voltage source, and a reset transistor connected between the floating diffusion node and the constant voltage source. The image sensor further includes a timing controller generating a sampling start signal, a sampler sampling the output pixel signal, based on the generated sampling start signal, to generate a sampling signal having a time interval corresponding to a magnitude of the output pixel signal, and a counter counting a counter clock during the time interval of the sampling signal, to generate a counting value. The timing controller generates sampling start signals n times in a reset state in which the floating diffusion node is reset by the reset transistor. The timing controller generates the sampling start signal once in a single PD state in which the floating diffusion node receives electric charges that are accumulated in the first photoelectric element by the first transmission transistor. The timing controller generates the sampling start signals the n times in a double PD state in which the floating diffusion node receives electric charges that are accumulated in the first photoelectric element and the second photoelectric element by the first transmission transistor and the second transmission transistor.

BRIEF DESCRIPTION OF THE DRAWINGS

FIGS. 1A and 1B are diagrams illustrating an image capture time of an image sensor according to embodiments.

DETAILED DESCRIPTION OF THE EMBODIMENTS

Figure 2A:
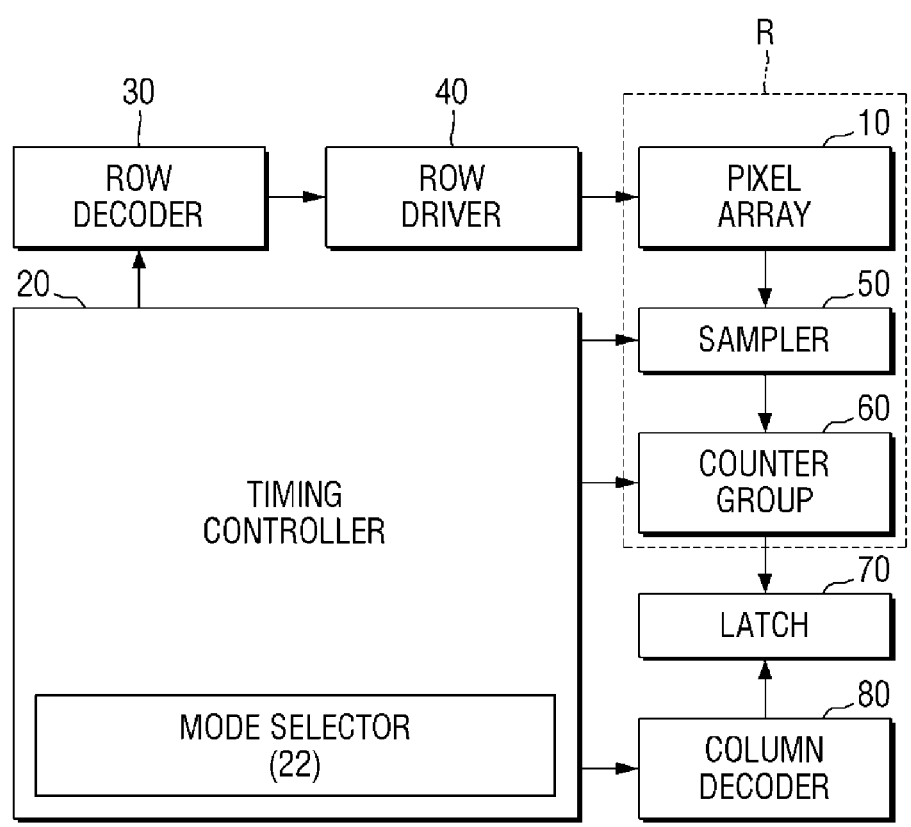
FIGS. 2A and 2B are block diagrams of an image sensor according to embodiments.

Aspects of the disclosure provide an image sensor having improved efficiency by reducing a time taken for capturing an image.

In embodiments, one pixel may include two photoelectric elements (i.e., first and second photoelectric elements). The pixel may output a pixel signal based on an amount of light received by each photoelectric element. For example, the pixel signal may include a reset output, a single PD output due to one photoelectric element, and a double PD output due to two photoelectric elements. The image sensor may output a digital value based on the output of the pixel signal.

The digital value output from the image sensor may be used for two purposes. First, the digital value output from the image sensor may be used to generate a sum data representing a total amount of light received by the first and second photoelectric elements of one pixel. The above-mentioned sum data may be used to construct the image data.

Second, the digital value output from the image sensor is used to generate difference data representing a difference in the amount of light received by the first and second photoelectric elements of one pixel. The aforementioned difference data may be used for auto-focusing. For example, the first and second photoelectric elements of the pixel may be located on left and right sides of the pixel, respectively. Therefore, in a central processing unit (CPU) or the like connected to the image sensor, by calculating a time difference and a focal length on the basis of the above-mentioned difference data, the auto-focusing may be performed.

The image sensor may output a first digital value corresponding to the light received by the first photoelectric element, and a second digital value corresponding to the light received by the second photoelectric element, respectively. At this time, the CPU or the like may generate the sum data from the sum of the first and second digital values, and may generate the difference data from the difference between the first and second digital values.

The image sensor may generate the first and second digital values in a RSRS (Reset-Signal-Reset-Signal) method. For example, the image sensor may output the first digital value on the basis of the difference between the reset output and the single PD output due to the first photoelectric element. Furthermore, the image sensor may output a second digital value on the basis of the difference between the reset output and the single PD output due to the second photoelectric element.

However, according on the RSRS method, when the sum data is generated from the first and second digital values, the sum data may have large (or relatively large) noise. For example, the first and second digital values may have a fixed noise of $N_{fixed}$ and a random noise fixed of $N_{random}$. In this case, the sum data may have a fixed noise of $2 \times N_{fixed}$ and a random noise of $2^{1/2} \times N_{radnom}$. As mentioned above, the sum data may be used to construct the image data. Therefore, if the noise of the sum data increases, the quality of the image data may be degraded.

In embodiments, to reduce the noise of the sum data, the image sensor may generate a third digital value representing the amount of light received by one of the first and second photoelectric elements, and a fourth digital value representing the total amount of light received by the first and second photoelectric elements. At this time, the CPU or the like may generate the sum data from the sum of the fourth digital value, and may generate the difference data from the difference between the third and fourth digital values.

The image sensor may generate the third and fourth digital values on the basis of the RSS (Reset-Signal-Signal) method. For example, the image sensor may output the third digital value on the basis of the difference between the reset output and the single PD output due to one of the first and the second photoelectric elements. Further, the image sensor may output the fourth digital value on the basis of the difference between the reset output and the double PD output due to the first and second photoelectric elements.

In this way, when generating the sum data from the fourth digital value according to the RSS method, the sum data may have small (or relatively small) noise. For example, the fourth digital value may have a fixed noise of $N_{fixed}$ and a random noise of $N_{radnom}$. In this case, the sum data may have a fixed noise of $N_{fixed}$ and a random noise of $N_{random}$. Therefore, when generating the third and the fourth digital data in accordance with the RSS method, data with small noise is obtained, and the quality of the image data may be improved.

Hereinafter, the operation of the image sensor according to embodiments will be described with reference to FIGS. 1A and 1B.

FIGS. 1A and 1B are diagrams illustrating an image capture time of an image sensor according to embodiments.

As a method for improving the quality of image data, the image sensor may use a multi-sampling technique. For example, in the RSS method, the image sensor samples the reset output n times, samples the single PD output due to one of the first and second photoelectric elements n times, and samples the double PD output due to the first and second photoelectric elements n times, thereby generating third and fourth digital values.

Referring to FIG. 1A, in the RSS method, when the image sensor uses a multi-sampling technique, the third and fourth digital values may have small (or relatively small) noise. For example, when the multi-sampling technique is not used, the third and fourth digital values may have noise of $N_3$ and $N_4$, respectively. On the other hand, when multi-sampling techniques are used n times, the third and fourth digital values may have noise of $1/n^{1/2} \times N_3$ and $1/n^{1/2} \times N_4$, respectively.

However, the image sensor may use a long consuming time when generating the third and fourth digital values using the multi-sampling techniques n times. The image sensor may consume only the time of T to generate the third and fourth digital values without using a multi-sampling technique. The image sensor may consume only the time of n×T when generating the third and fourth digital values using the multi-sampling techniques n times. For example, the image sensor may consume the time of 2×T or 4×T to generate third and fourth digital values using two or four multi-sampling techniques.

Referring to FIG. 1B, the image sensor according to embodiments may operate in a low-noise n mode, thereby reducing noise of sum data and reducing the consuming time used to generate the third and fourth digital values. In the low-noise n mode, the image sensor samples the reset output n times, samples the single PD output due to one of the first and the second photoelectric elements once, and samples the double PD output due to the first and second photoelectric elements n times, thereby generating the third and fourth digital values.

That is, the image sensor may reduce the consuming time used to generate the third and fourth digital values by sampling the single PD output only once in the low-noise n mode. For example, the image sensor may consume the time of 1.6×T or 2.8×T to generate the third and fourth digital values in the low-noise 2 (LN2) mode or the low-noise 4 (LN4) mode. In this way, when the image sensor generates the third and fourth digital values in the low-noise 2 mode or the low-noise 4 mode, the consuming time of 20% and 30% may be reduced, respectively, as compared with the case in which the two or four multi-sampling techniques are used. Also, the consuming time of the image sensor may correspond to the power used in the image sensor. Therefore, the image sensor may save 20% or 30% of power respectively, when operating in the low-noise 2 mode or the low-noise 4 mode.

Hereinafter, an image sensor operating in a low-noise n mode according to embodiments will be described referring to FIGS. 2A to 6C.

Figure 2B:
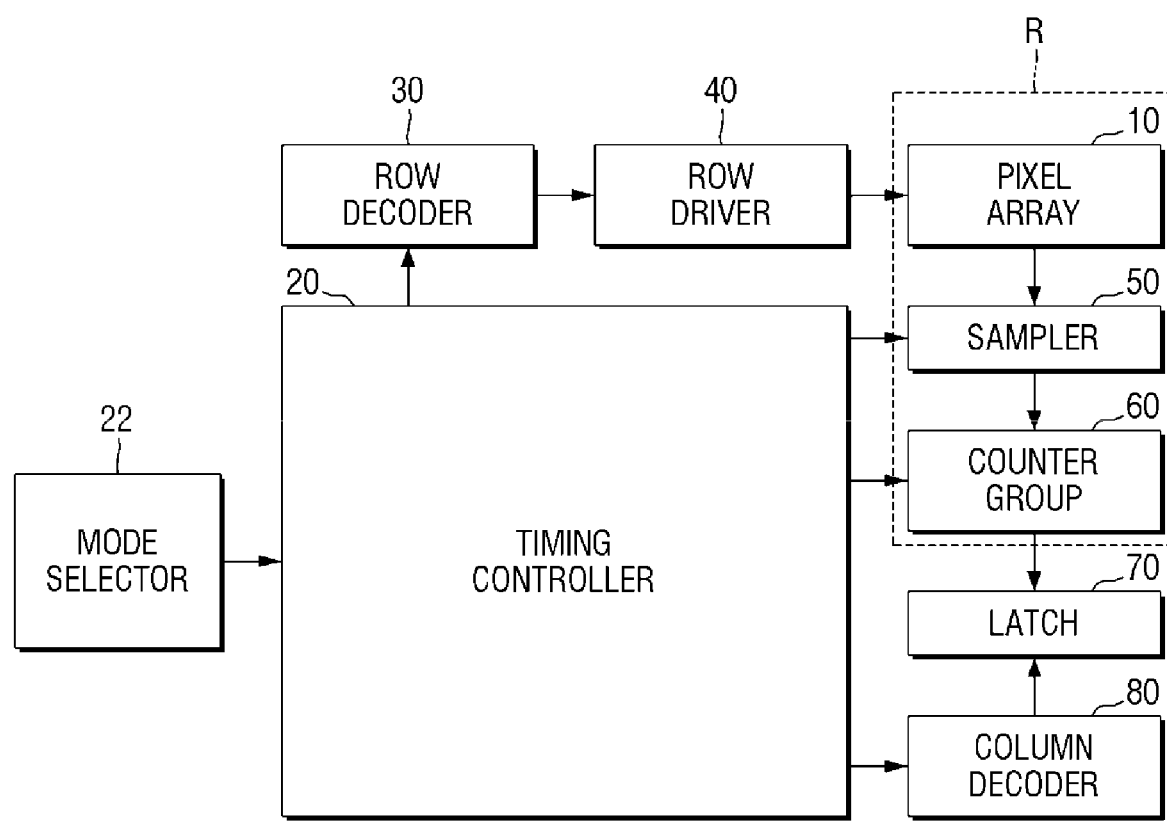

FIGS. 2A and 2B are block diagrams of an image sensor according to embodiments.

Referring to FIG. 2A, the image sensor according to embodiments includes a pixel array 10 in which pixels including photoelectric elements are two-dimensionally arranged, a timing controller 20, a row decoder 30, a row driver 40, a sampler 50, a counter group 60, a latch 70, a column decoder 80 and the like.

The pixel array 10 includes a plurality of unit pixels two-dimensionally arranged. The plurality of unit pixels serves to convert an optical image into an electrical output signal. The pixel array 10 is driven by receiving a plurality of driving signals such as a row selection signal, a reset signal and a charge transmission signal from the row driver 40. Also, the converted electric signal voltage is provided to the sampler 50 via a vertical signal line.

The timing controller 20 may include a mode selector 22. The mode selector 22 may determine the operation mode of the image sensor. For example, the image sensor may operate in a normal mode or a low-noise n mode. That is, the mode selector 22 may determine n (for example, if the mode selector determines n to be 1, the image sensor operates in the normal mode, and if the mode selector determines n to be an integer of 2 or more, the image sensor may operate in a low-noise n mode).

As described above, when the image sensor operates in the low-noise n mode, the image sensor may sample the reset output of the pixel signal n times, may sample the single PD of the pixel signal one times, and may sample the double PD output of the pixel signal n times. Although the image sensor according to embodiments has been described as operating in the low-noise n mode when n is 2 or 4, the disclosure is not limited thereto. For example, n may be other integers of 2 or more rather than 2 or 4.

The timing controller 20 provides the timing signal and the control signal to the row decoder 30, the sampler 50, the counter group 60 and the column decoder 80 on the basis of the operation mode of the image sensor determined by the mode selector 22. For example, the timing controller 20 may provide a sampling start signal to the sampler 50 on the basis of the operation mode of the image sensor. Also, the timing controller 20 may provide a counter clock to the counter group 60. In embodiments, the timing controller 20 may provide a sampling start signal to the sampler 50 and provide a counter clock and the sampling start signal to the counter group 60, on the basis of the operation mode of the image sensor. In embodiments, the sampling start signal may be a pulse signal representing the sampling start of the sampler 50. For example, the sampler 50 may start sampling each time the sampling start signal is input.

The row driver 40 provides a plurality of driving signals for driving the plurality of unit pixels to the pixel array 10 in accordance with the result decoded by the row decoder 30. When the unit pixels are arranged in the form of a matrix, the driving signal is provided for each row.

The sampler 50 receives the pixel signal generated by the pixel array 10 to sample the output of the pixel signal. That is, the sampler may generate a sampling signal having a time interval corresponding to the magnitude of the output of the pixel signal, by comparing the output of the pixel signal with a ramp voltage of a ramp signal that is constantly reduced. An operation of the sampler 50 will be described in detail below.

The counter group 60 may count the sampling signal in accordance with the counter clock to output a digital value. The digital value may be related to the illuminance of incident light applied to the pixel. That is, as the illuminance of the incident light is high, the electric charge accumulation of the photoelectric element inside the pixel increases, and the magnitude of the output of pixel signal may increase accordingly. Therefore, the time interval of the sampling signal may be increased, the number of counting times increases accordingly, and as a consequence, a larger digital value may be generated. The operation of the counter group 60 will be described in detail below.

A latch 70 latches the digital signal, and the latched signal is sequentially output to the image signal processing unit in accordance with the decoding result by the column decoder 80.

Referring to FIG. 2B, the image sensor according to embodiments may include a mode selector 22 disposed outside the timing controller 20. For example, the mode selector 22 may determine the operation mode of the image sensor and transfer information on the determined operation mode to the timing controller 20.

The pixel array 10, the sampler 50 and the counter group 60 of a region R disclosed in FIGS. 2A and 2B will be described below referring to FIGS. 3A, 3B, and 3C.

Figure 3A:
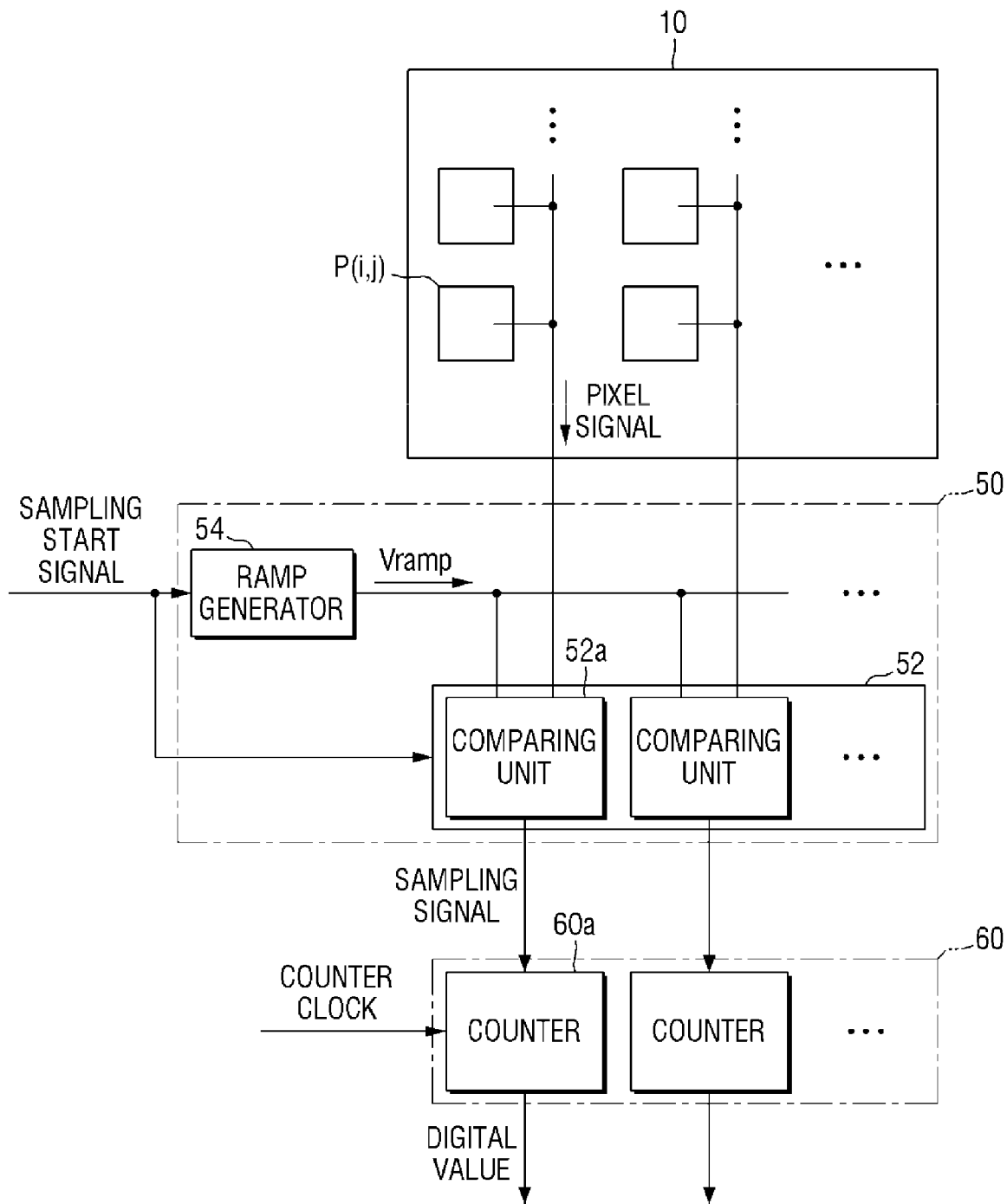
FIG. 3A is a block diagram illustrating a pixel array, a sampler, and a counter group of the image sensor according to embodiments.

FIG. 3A is a block diagram illustrating the pixel array, the sampler, and the counter group of the image sensor according to embodiments.

Referring to FIG. 3A, the pixel array 10 may include a plurality of pixels (P(i, j)). The plurality of pixels (P(i, j)) may be aligned by a plurality of rows (i) and a plurality of columns (j). A vertical signal line is arranged for each of the plurality of columns (j) to output a pixel signal that is an output of the pixel (P(i, j)).

The sampler 50 may receive a sampling start signal from the timing controller 20 and a pixel signal from the pixel (P(i, j)) to generate a sampling signal. According to embodiments, the sampler 50 may include a ramp generator 54 and a comparator group 52.

The ramp generator 54 may generate the ramp voltage Vramp. The ramp voltage Vramp may be a signal for converting an analog signal to a digital signal and have a form of a triangular wave. The ramp generator 54 may generate the ramp voltage Vramp on the basis of the sampling start signal from the timing controller 20. For example, the magnitude of the ramp voltage Vramp may be constantly reduced in accordance with the ramp clock that is input from the timing controller 20, from the time point at which the sampling start signal is input. The ramp voltage Vramp generated by the ramp generator 54 may be applied to the comparator group 52. For example, the ramp voltage Vramp generated by the ramp generator 54 may be applied to each comparing unit 52a of the comparator group 52.

The comparator group 52 may include a plurality of comparators 52a. Each of the plurality of comparators 52a may be connected to a single vertical signal line arranged for each column (j) of the pixel array 10 on a one-to-one basis.

In FIG. 3A, the comparator 52a may generate a sampling signal on the basis of the ramp voltage Vramp, the pixel signal, and the sampling start signal.

First, the comparator 52a may compare the magnitude of the output of the pixel signal of the pixel (P(i, j)) with the magnitude of the ramp voltage Vramp to generate a comparison signal. The comparison signal may indicate whether the magnitude of the ramp voltage Vramp is greater than the magnitude of the output of the pixel signal. For example, if the ramp voltage Vramp is large, the comparison signal may have a high voltage representing 1. Also, if the magnitude of the output of the pixel signal is larger, the comparison signal may have a low voltage representing 0.

Further, the comparator 52a may generate the sampling signal on the basis of the sampling start signal and the comparison signal. The sampling signal may have a voltage from the time point at which the sampling start signal is input to the time point at which the comparison signal is switched from the high voltage to the low voltage, and may have the low voltage in other sections.

In embodiments, the magnitude of the ramp voltage Vramp input to the comparator 52a may be greater than the magnitude of the output of the pixel signal at the time point when the sampling start signal is input. Therefore, the comparison signal may have a high voltage at the time when the sampling start signal is input. Further, the magnitude of the ramp voltage Vramp may decrease constantly from the time point at which the sampling start signal is input. Therefore, after a lapse of a predetermined time from the time point at which the sampling start signal is input, at the time point when the magnitude of the ramp voltage Vramp becomes smaller than the magnitude of the output voltage of the pixel signal, the comparison signal may be switched from a high voltage to a low voltage.

Because the magnitude of the ramp voltage Vramp decreases constantly from the time point at which the sampling start signal is input, the time interval from the time point of the input of the sampling start signal to the time point at which the comparison signal is switched from the high voltage to the low voltage may be proportional to a difference between the magnitude of the ramp voltage Vramp and the magnitude of the voltage of the pixel signal. Also, the magnitude of the ramp voltage Vramp at the time point when each sampling start signal is input may be constant. Therefore, the time interval from the time point of input of the sampling start signal to the time point at which the comparison signal is switched from the high voltage to the low voltage may correspond to the magnitude of the voltage of the pixel signal.

For example, the comparator 52a outputs a high voltage from the time point at which the sampling start signal is input, and may output a low voltage from the time point at which the comparison signal is switched from the high voltage to the low voltage. That is, the sampling start signal may have a high voltage during a time interval corresponding to the magnitude of the voltage of the pixel signal. In this way, the sampling signal generated from the comparator may have a high voltage during the time interval corresponding to the magnitude of the output of the pixel signal.

The counter group 60 may include a plurality of counters 60a. Each of the plurality of counters 60a may be connected to the comparator 52a on a one-to-one basis.

In FIG. 3A, the counter 60a may generate a digital signal on the basis of the sampling clock from the sampler 50 and the counter clock from the timing controller 20. For example, the counter 60a may count the counter clock during the time interval when the sampling signal has a high voltage to generate a digital signal or digital value. Because the sampling signal has a high voltage during the time interval corresponding to the magnitude of the output of the pixel signal and the counter clock has a fixed time interval, the digital signal generated from the counter 60a may correspond to the magnitude of the output of the pixel signal. An operation of the counter 60a will be described below.

Figure 3B:
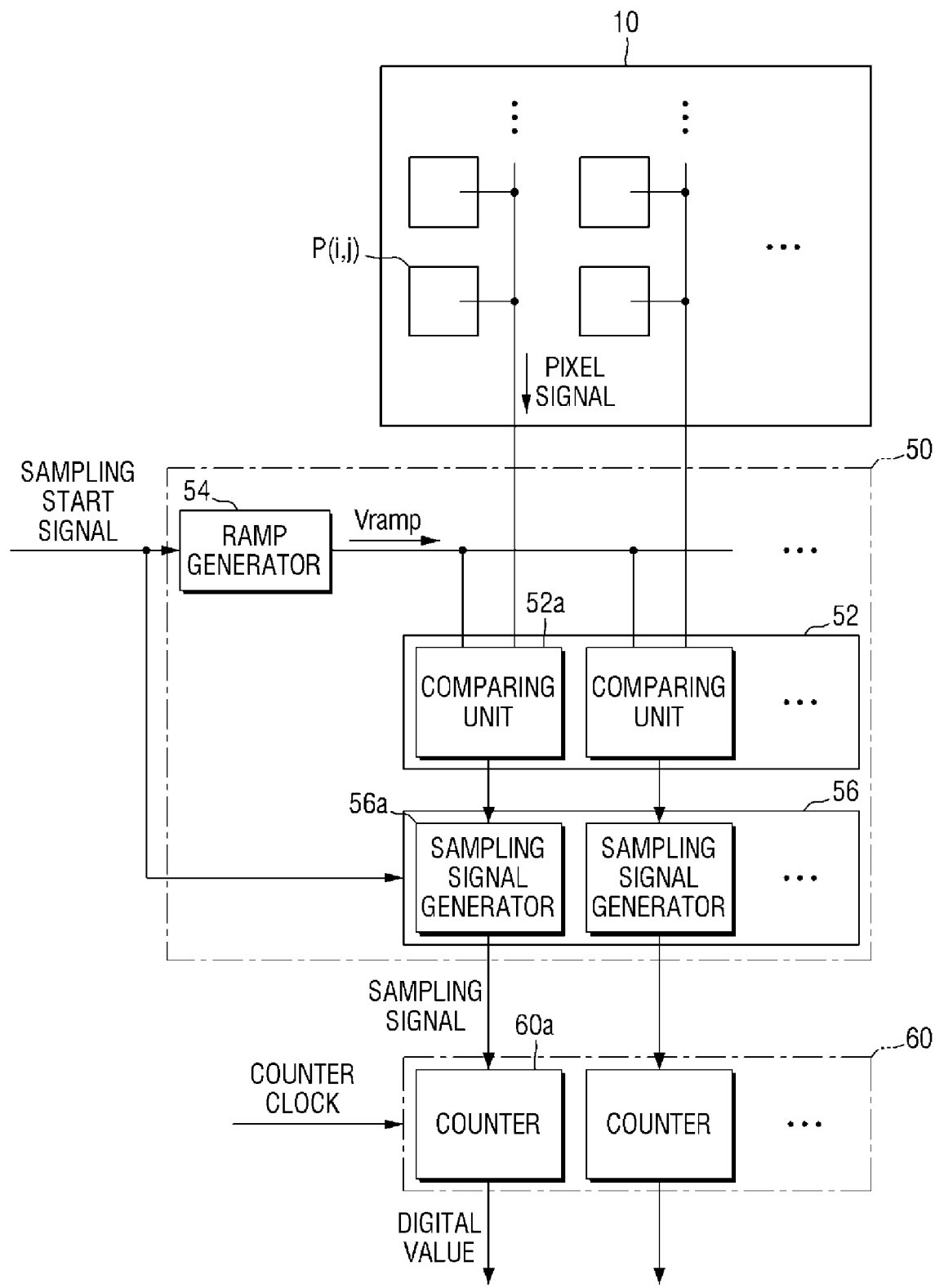
FIG. 3B is a block diagram illustrating the pixel array, the sampler, and the counter group of the image sensor according to embodiments.

FIG. 3B is a block diagram illustrating the pixel array, the sampler, and the counter group of the image sensor according to embodiments. For the sake of convenience of explanation, repeated parts of the above embodiment will be omitted or briefly explained.

Referring to FIG. 3B, the sampler 50 may include a ramp generator 54, a comparator group 52, and a sampling signal generator group 56.

The comparator 52a may generate a comparison signal by comparing the magnitude of the ramp voltage from the ramp generator 54 with the magnitude of the output of the pixel signal. For example, the comparator 52a of FIG. 3B may be a double correlation sampler (CDS).

The sampling signal generator group 56 may include a plurality of sampling signal generators 56a. Each of the plurality of sampling signal generators 56a may be connected to the comparator 52a on a one-to-one basis.

The sampling signal generator 56a may generate the sampling signal on the basis of the sampling start signal from the timing controller 20 and the comparison signal from the comparator 52a. As described above, the sampling signal has a high voltage from the time point at which the sampling start signal is input to the time point at which the comparison signal is switched from the high voltage to the low voltage, and may have the low voltage in other sections.

The counter group 60 may include a plurality of counters 60a. Each of the plurality of counters 60a may be connected to the sampling signal generator 56a on the one-to-one basis.

Figure 3C:
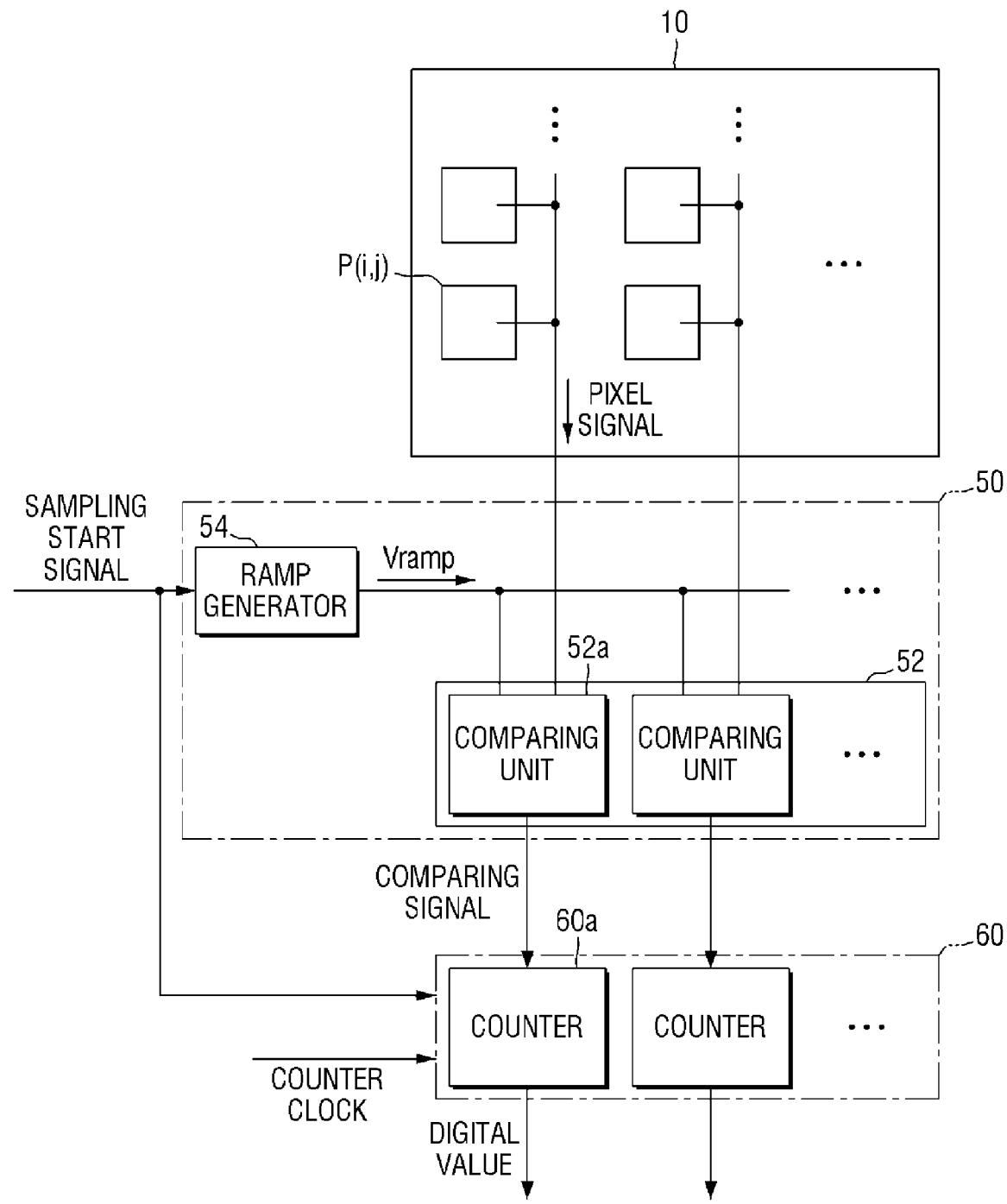
FIG. 3C is a block diagram illustrating the pixel array, the sampler, and the counter group of the image sensor according to embodiments.

FIG. 3C is a block diagram illustrating the pixel array, the sampler, and the counter group of the image sensor according to embodiments. For the sake of convenience of explanation, repeated parts of the above embodiment will be omitted or briefly explained.

Referring to FIG. 3C, the sampler 50 may include a ramp generator 54 and a comparator group 52.

The comparator 52a may generate a comparison signal by comparing the magnitude of the ramp voltage from the ramp generator 54 with the magnitude of the output of the pixel signal. For example, the comparator 52a of FIG. 3C may be a double correlation sampler (CDS).

The counter group 60 may include a plurality of counters 60a. Each of the plurality of counters 60a may be connected to the comparator 52a on the one-to-one basis.

In FIG. 3C, the counter 60a may generate a digital signal, on the basis of the sampling start signal and the counter clock from the timing controller 20, and the comparison signal from the sampler 50. For example, the counter 60a starts counting the counter clock at the time point when the sampling start signal is input, and may stop counting at the time point when the output of the comparison signal changes from the high voltage to the low voltage. That is, as described above, because the time interval from the time point of input of the sampling start signal to the time point at which the output of the comparison signal changes from the high voltage to the low voltage corresponds to the magnitude of the output of the pixel signal, the digital signal generated by the counter 60a may correspond to the magnitude of the output of the pixel signal.

In this way, the counter 60a of FIG. 3C may receive the comparison signal from the sampler 50 and the sampling start signal from the timing controller 20 to generate the digital signal corresponding to the magnitude of the output of pixel signal. Further, the operation of the counter 60a of FIG. 3C may be regarded as corresponding to the operation in which the counter 60a of FIG. 3A or 3B receives the sampling signal to generate the digital signal corresponding to the magnitude of the output of the pixel signal. Hereinafter, for the sake of convenience of explanation, as illustrated in FIG. 3A or 3B, the operation of the counter 60a will be described as receiving the sampling signal to generate the digital signal corresponding to the magnitude of the output of the pixel signal. However, it may be clearly understood that the configuration of the counter as in FIG. 3C of the disclosure is not excluded by such an explanation. For example, the sampling signal input to the counter 60a may be regarded as corresponding to the comparison signal and the sampling start signal that are input to the counter 60a.

Hereinafter, the configuration of the pixel (P(i, j)) of the pixel array 10 will be described with reference to FIG. 4.

Figure 4:
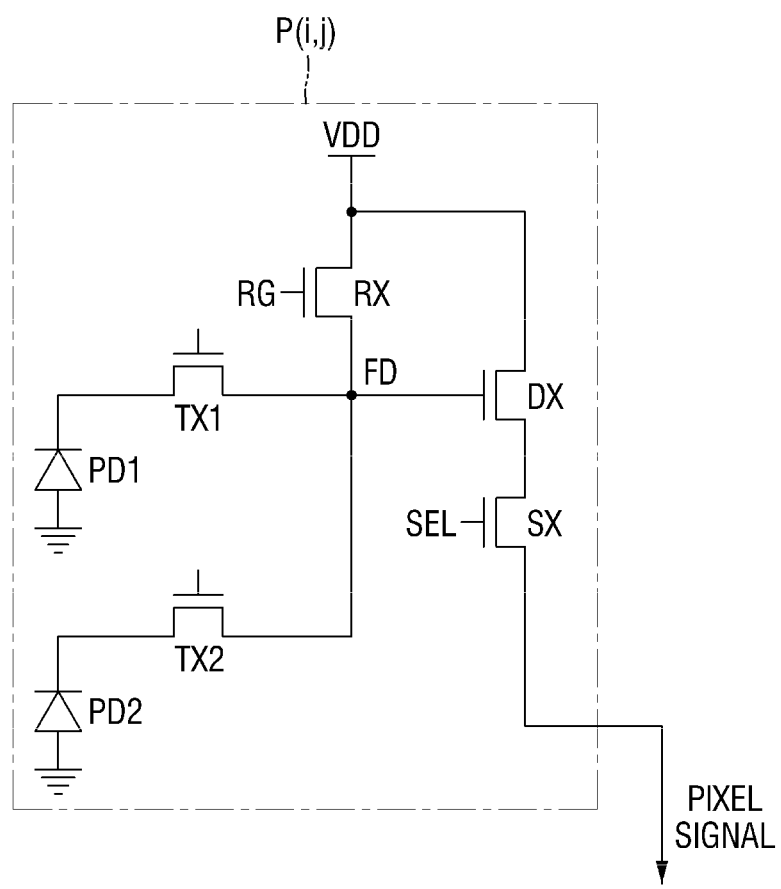
FIG. 4 is an equivalent circuit diagram illustrating pixels of FIGS. 3A to 3C in detail.

FIG. 4 is an equivalent circuit diagram illustrating the pixels of FIGS. 3A to 3C in detail.

In FIG. 4, the pixel (P(i, j)) is illustrated as including two photoelectric elements PD1 and PD2, two transmission transistors TX1 and TX2, a reset transistor RX, a drive transistor DX and a selection transistor SX. However, this is to explain the structure of the pixel according to embodiments, and the pixel of the disclosure is not limited thereto.

The first transmission transistor TX1 may connect the first photoelectric element PD1 and the floating diffusion node FD. That is, when the first transmission transistor TX1 operates, the electric charges accumulated in the first photoelectric element PD1 may be transmitted to the floating diffusion node FD. The second transmission transistor TX2 may connect the second photoelectric element PD2 and the floating diffusion node FD. That is, when the second transmission transistor TX2 operates, the electric charges accumulated in the second photoelectric element PD2 may be transmitted to the floating diffusion node FD. The first transmission transistor TX1 and the second transmission transistor TX2 may be connected to each other via the floating diffusion node FD.

The floating diffusion node FD may be reset by a reset circuit including a reset transistor RX and a constant voltage source VDD. The floating diffusion node FD may be connected to the constant voltage source VDD via the reset transistor RX controlled by the reset signal RG. That is, when the reset transistor RX operates, the floating diffusion node FD may have a constant voltage by the constant voltage source VDD.

The floating diffusion node FD may be connected to a gate terminal of a drive transistor DX having a source follower configuration. That is, the operation of the drive transistor DX may be determined depending on the magnitude of the voltage of the floating diffusion node FD.

The selection transistor SX may determine whether the pixel (P(i, j)) is selected, by the selection signal SEL. That is, when the selection transistor SX operates by the selection signal SEL, a current due to the drive transistor DX operating by the floating diffusion node FD may be output as a pixel signal. That is, the pixel (P(i, j)) may output the pixel signal via the reception signal line only when the selection transistor SX operates.

Hereinafter, the counter 60a will be described in detail with reference to FIGS. 5 to 6C.

Figure 5:
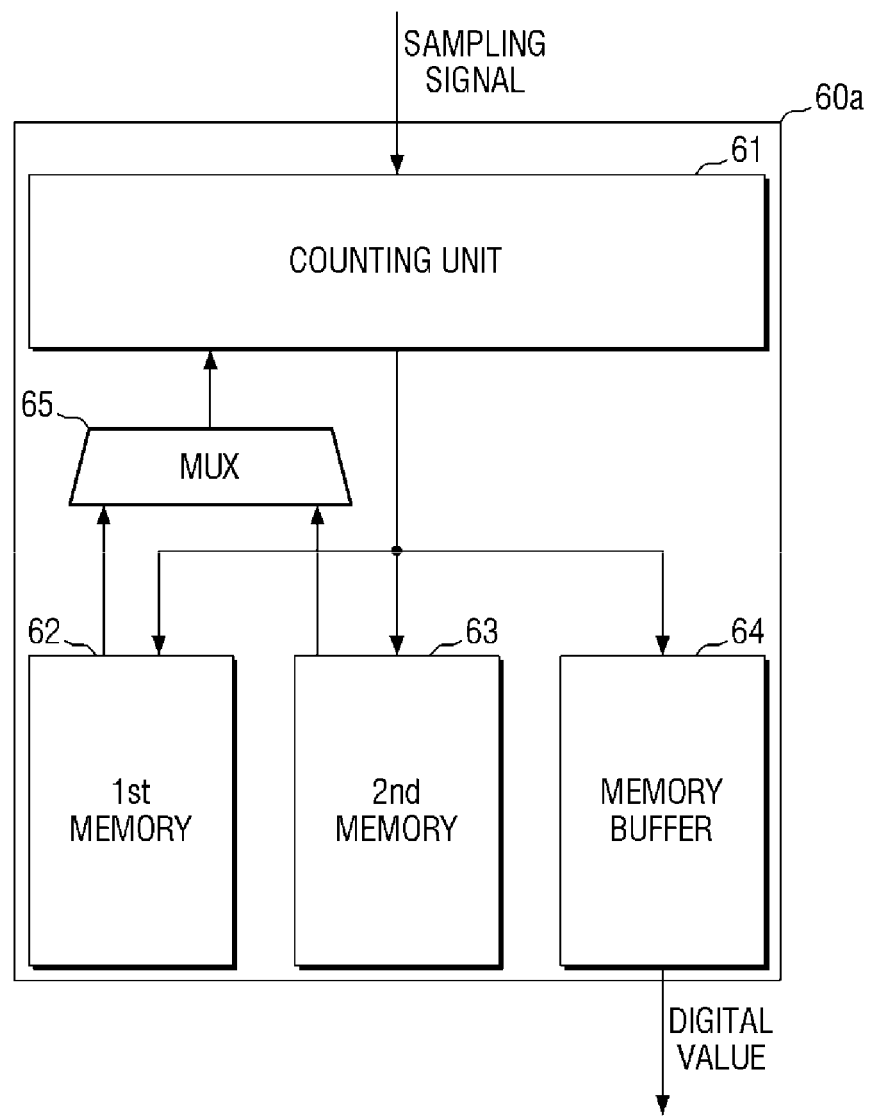
FIG. 5 is a block diagram illustrating a counter of FIGS. 3A to 3C in detail.
Figure 6A:
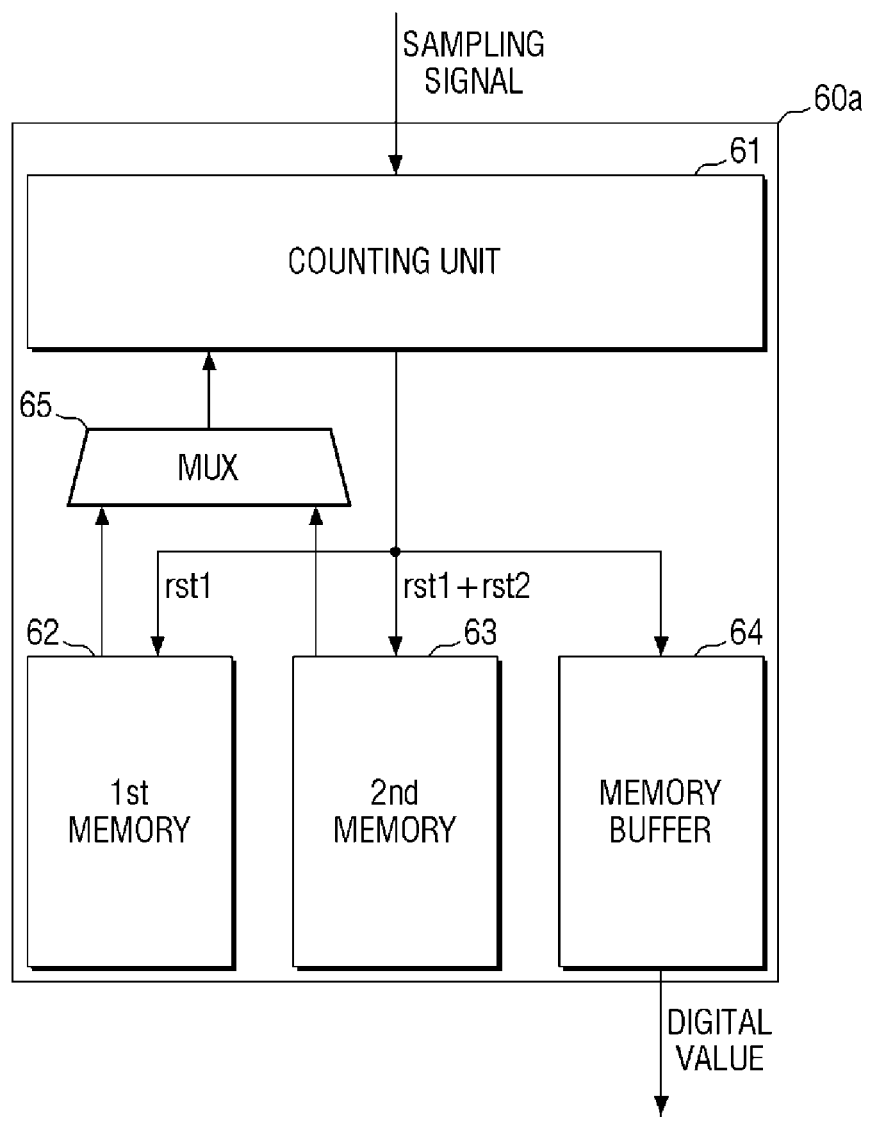
FIGS. 6A, 6B, and 6C are block diagrams illustrating operation of the counter of FIG. 5.
Figure 6B:
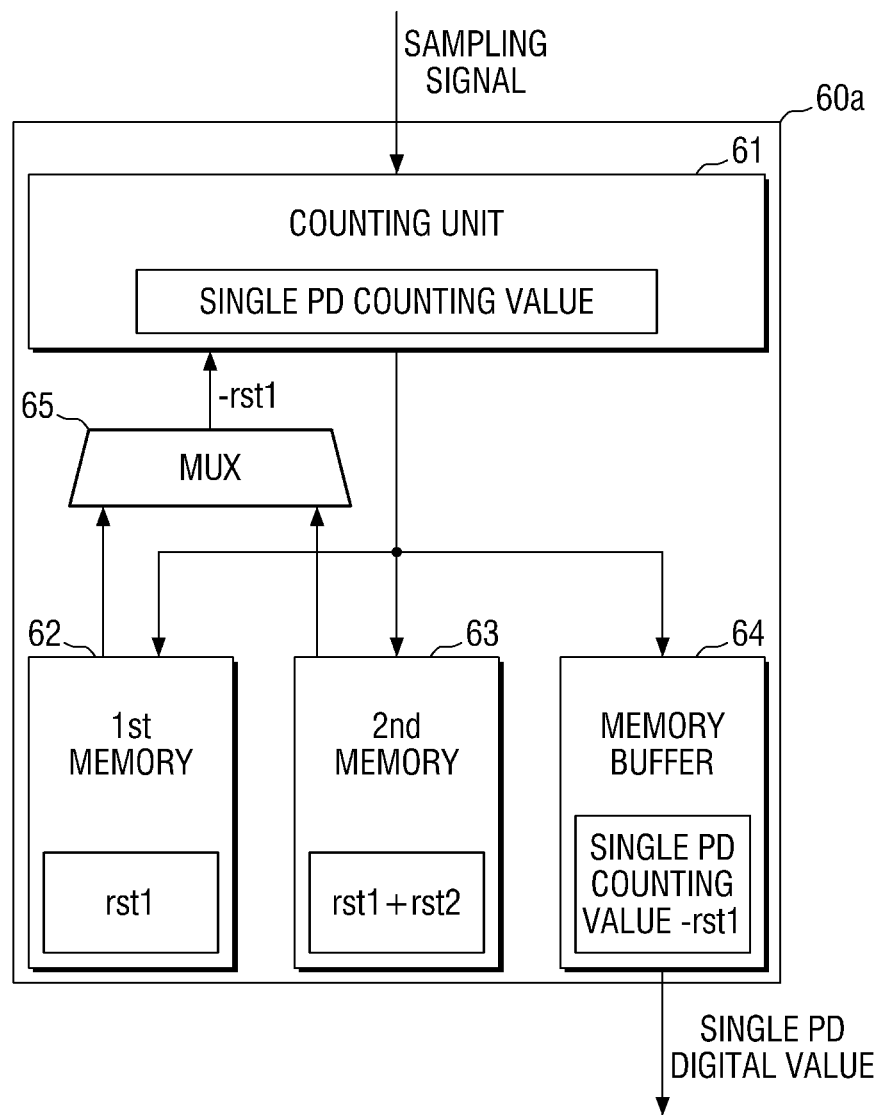

FIG. 5 is a block diagram illustrating the counter of FIGS. 3A to 3C in detail. FIGS. 6A, 6B and 6C are block diagrams illustrating operation of the counter of FIG. 5.

Referring to FIG. 5, the counter 60a may include a counting unit 61, first and second memories 62 and 63, a memory buffer 64, and a mux 65. The counter 60a may receive input of the sampling signal from the sampler 50. The counter 60a may receive input of a counter clock from the timing controller 20. The counter 60a may output a digital value corresponding to the magnitude of the output of the pixel signal on the basis of the sampling signal and the counter clock. For example, the counter 60a may output a single PD digital value or a double PD digital value, which will be explained below.

The counting unit 61 may count the counting clock in accordance with the sampling signal that is input to the counter 60a. For example, the counting unit 61 may perform up-counting of the counting clock in accordance with the sampling signal. The counting unit 61 may increase the counting value by 1 at a time in accordance with a rising edge (or a falling edge) of the counter clock during the time interval at which the sampling signal input to the counter 60a has a value of 1. As another example, the counting unit 61 may perform down-counting of the counting clock in accordance with the sampling signal. The counting unit 61 may decrease the counting value by 1 at a time in accordance with the rising edge (or the falling edge) of the counter clock during the time interval at which the sampling signal input to the counter 60a has a value of 1. The counter according to embodiments may perform down-counting of the sampling signal in a reset state. Further, the counter may perform up-counting of the sampling signal in the single PD state or the double PD state.

Referring to FIG. 6A, the first memory 62 of the counter 60a may store a first reset counting value (rst1) obtained by counting the first sampling signal of the reset state (i.e., a first reset sampling signal). For example, the counting unit 61 may perform down-counting of the first reset sampling signal and store the resultant value in the first memory 62.

The second memory 63 of the counter 60a may store a second reset counting value (rst1+rst2) obtained by sequentially counting the n sampling signals of the reset state (i.e., the first to n-th reset sampling signals). For example, when the image sensor operates in the low-noise 2 mode, the counting unit 61 sequentially performs down-counting of the first and second reset sampling signals, and may store the resultant value in the second memory 63. As another example, when the image sensor operates in the low-noise 4 mode, the counting unit 61 sequentially performs down-counting of the first to fourth reset sampling signals and may store the resultant value in the second memory 63.

The mux 65 of the counter 60a may select the values stored in the first and second memories 63 and transfer the values to the counting unit 61.

For example, referring to FIG. 6B, when the counter 60a receives the sampling signal of a single PD state (that is, a single PD sampling signal or counting value), the mux 65 may transfer the first reset counting value (−rst1) stored in the first memory to the counting unit 61. At this time, the counting unit 61 may perform up-counting of the single PD sampling signal from the first reset counting value received from the mux 65 to generate the single PD digital value. Thus, the single PD digital value may represent a difference between one reset output (down-counting) and one single PD output (up-counting) of the pixel. In other words, the single PD digital value may be a value obtained by sampling the amount of light received once, by one of the two photoelectric elements.

Figure 6C:
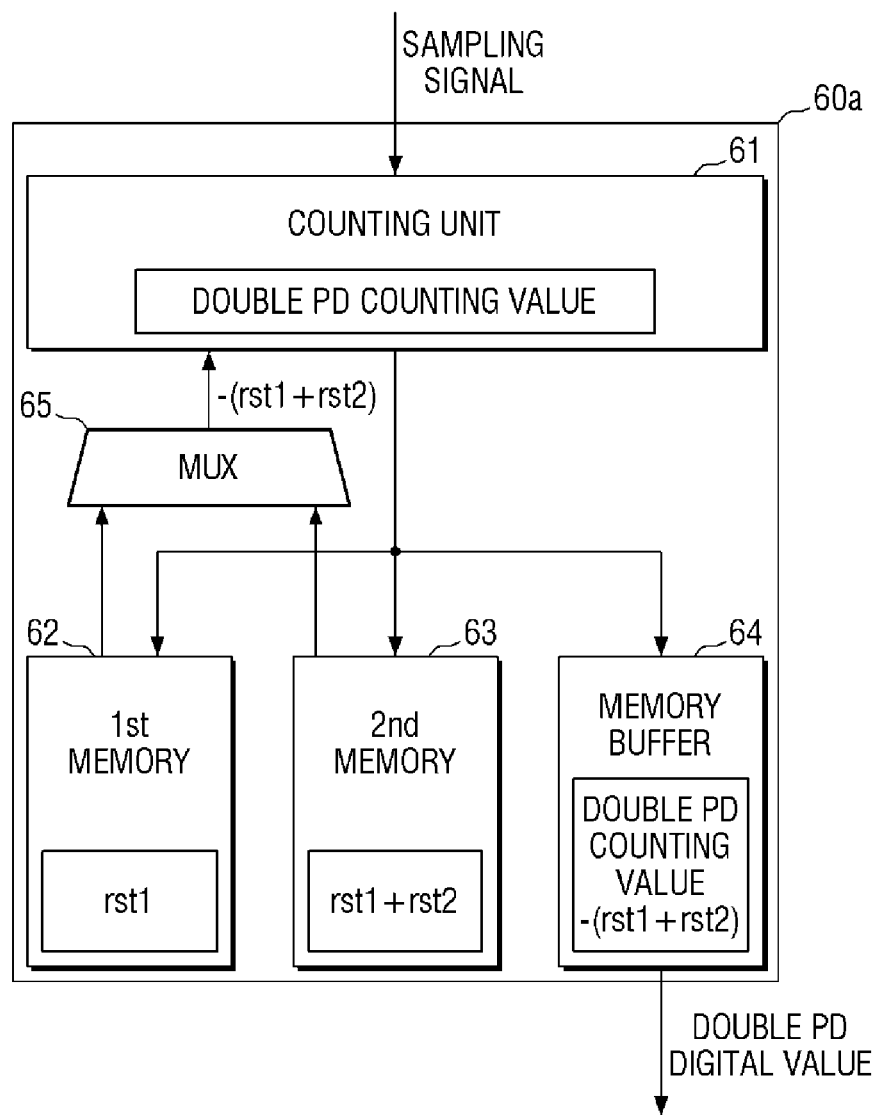

As another example, referring to FIG. 6C, when the counter 60a receives the first sampling signal (i.e., a first double PD sampling signal or counting value) of the double PD state, the mux 65 may transfer the second reset counting value (−(rst1+rst2)) stored in the second memory 63 to the counting unit 61. At this time, the counting unit 61 may perform up-counting of the first to n-th double PD sampling signals from the second reset counting value received from the mux 65 to generate a double PD digital value. Therefore, the double PD digital value may represent a difference between the n reset outputs (down-counting) and n double PD outputs (up-counting) of the pixel. That is, the double PD digital value may be a value obtained by adding the values obtained by sampling the total amount of the received light n times, by the two photoelectric elements.

The memory buffer 64 of the counter 60a may store the digital value that is the output value of the counter 60a. For example, the memory buffer 64 may store a single PD digital value or a double PD digital value.

Hereinafter, the operation of the image sensor will be described in detail with reference to FIGS. 1 to 9.

Figure 7:
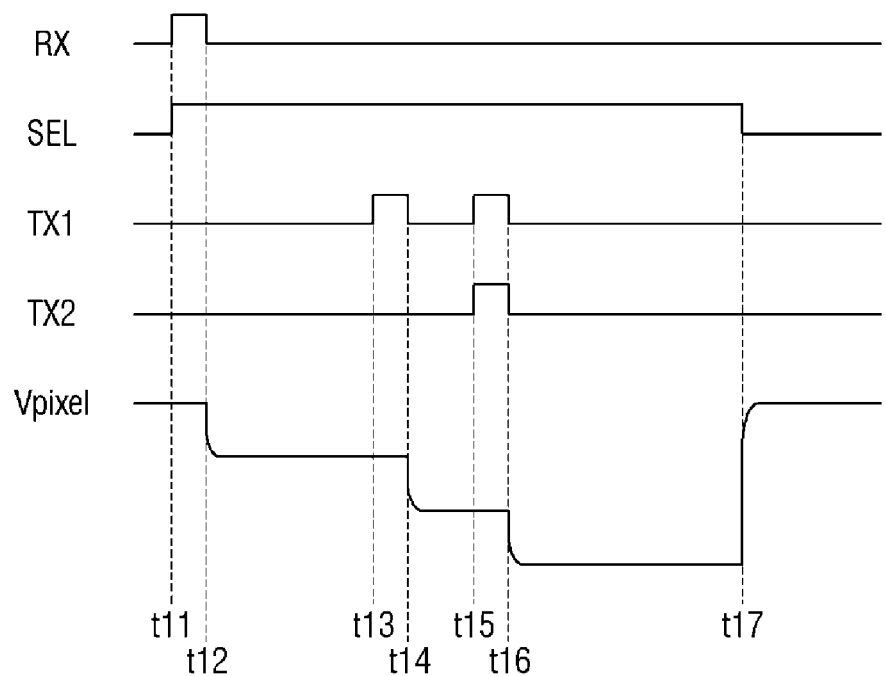
FIG. 7 is a waveform diagram illustrating operation of a pixel according embodiments.
Figure 8:
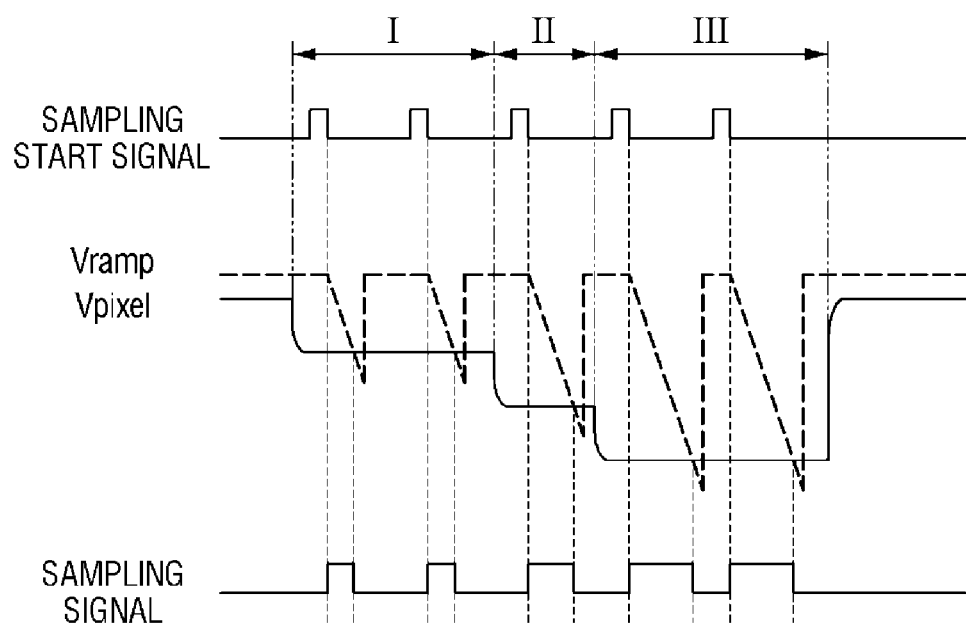
FIG. 8 is a waveform diagram illustrating operation of a sampler according to embodiments.
Figure 9:
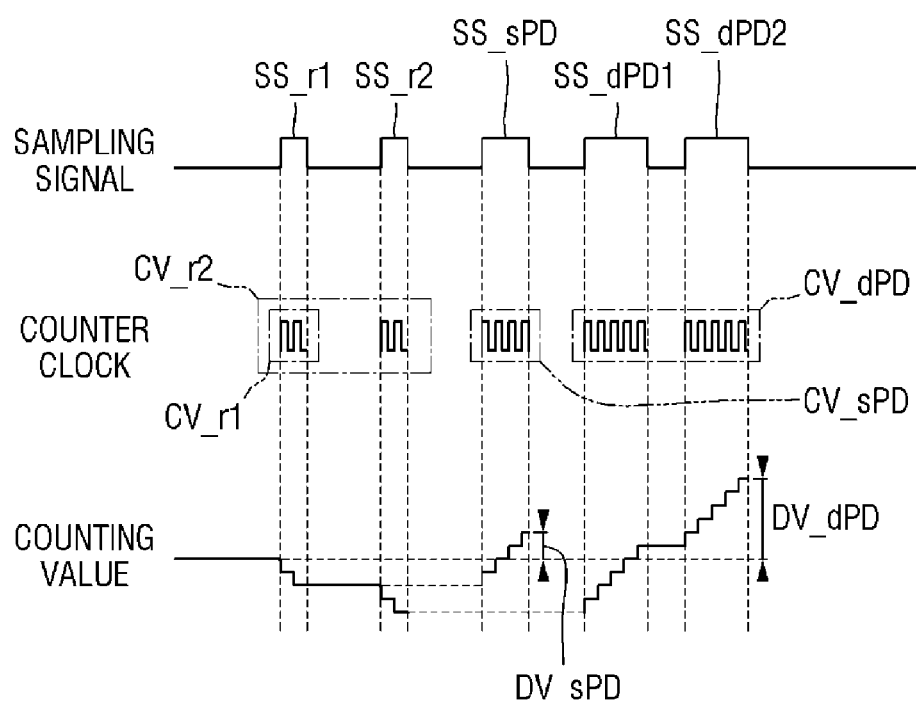
FIG. 9 is a waveform diagram illustrating operation of a counter according to embodiments.

FIG. 7 is a waveform diagram illustrating operation of a pixel according to embodiments. FIG. 8 is a waveform diagram illustrating operation of a sampler according to embodiments. FIG. 9 is a waveform diagram illustrating operation of a counter according to embodiments. For convenience of description, the image sensor of FIGS. 8 and 9 may operate in a low-noise 2 mode.

In embodiments, the pixel (P(i, j)) may include two photoelectric elements. Referring to FIG. 7, the output Vpixel of the pixel signal may include the reset outputs from t12 to t14, the single PD outputs from t14 to t16, and the double PD outputs from t16 to t17.

The reset output may be the output of the pixel signal, when the floating diffusion node FD is reset by the operation of the reset transistor RX from t11 to t12 (that is, the reset state).

The single PD output may be an output of the pixel signal, when the floating diffusion node FD receives the electric charges accumulated in the first photoelectric element PD1 (or the second photoelectric element PD2) by the operation of the first transmission transistor TX1 (or the second transmission transistor) from t13 to t14 (i.e., the single PD state).

The double PD output may be an output of the pixel signal, when the floating diffusion node FD receives the electric charges accumulated in the first and second photoelectric elements PD1 and PD2 by the first and second transmission transistors TX1 and TX2 from t15 to t16 (i.e., the double PD state).

Referring to FIG. 8, the timing controller 20 may generate the sampling start signal in accordance with the low-noise 2 mode.

For example, the timing controller 20 may generate the sampling start signals twice in the reset state (i.e., a section I) in which the floating diffusion node FD is reset by the reset transistor RX.

Further, the timing controller 20 may generate the sampling start signal once in the single PD state (i.e., a section II) in which the floating diffusion node FD receives the electric charges accumulated in the first and second photoelectric elements PD1 and PD2 by one of the first and second transmission transistors TX1 and TX2.

Further, the timing controller 20 may generate the sampling start signals twice in a double PD state (i.e., a section III) in which the floating diffusion node FD receives the electric charges accumulated in the first and second photoelectric elements PD1 and PD2 by the first and second transmission transistors TX1 and TX2.

As described above, the sampler 50 compares the magnitude of the voltage Vramp of the ramp signal that constantly decreases from the input time point of the sampling start signal with the magnitude Vpixel of the output of the pixel signal, and may generate the sampling signal on the basis of the compared results. The sampling signal may have a value of 1 from the time point at which the sampling start signal is input to the time point at which the magnitude of the voltage Vramp of the ramp signal becomes smaller than the magnitude Vpixel of the output of the pixel signal, and may have a value of 0 in other sections.

The sampler 50 may generate the first and second reset sampling signals by sampling the reset output of the pixel signal in accordance with the two sampling start signals in the reset state (i.e., the section I).

The sampler 50 may generate a single PD sampling signal by sampling a single PD output of a pixel signal in accordance with the one single sampling start in the single PD state (i.e., the section II).

The sampler 50 may generate the first and second double PD sampling signals by sampling the single PD output of the pixel signal in accordance with the two sampling start signals in the double PD state (i.e., a section III).

Referring to FIG. 9, the sampling signal includes first and second reset sampling signals SS_r1 and SS_r2, a single PD sampling signal SS_sPD, and first and second double sampling signals SS_dPD1 and SS_dPD2.

As described above, the counter 60a may generate a first reset counting value CV_r1 by down-counting the first reset sampling signal SS_r1. For example, the counter 60a may generate a first reset counting value CV_r1, by decreasing the counting value by 1 at a time in accordance with the rising edge of the counter clock during the time interval at which the first reset sampling signal SS_r1 has the value of 1.

The counter 60a may generate a second reset counting value by sequentially down-counting the first and second reset sampling signals SS_r1 and SS_r2. For example, the counter 60a may generate a second reset counting value CV_r2, by decreasing the counting value by 1 at a time in accordance with the rising edge of the counter clock during the time interval at which the first and second reset sampling signals SS_r1 and SS_r2 have a value of 1.

As described above, the counter 60a may generate a single PD counting value CV_sPD by up-counting the single PD sampling signal SS_sPD. As an example, the counter 60a may generate a single PD counting value CV_sPD, by increasing the counting value by 1 at a time in accordance with the rising edge of the counter clock during the time interval at which the single PD sampling signal SS_sPD has the value of 1.

As another example, the counter 60a may generate a single PD digital value DV_sPD, by up-counting the single PD sampling signal SS_sPD from the first reset counting value CV_r1. In this case, the counter 60a may generate a single PD digital value DV_sPD corresponding to a difference (i.e., CV_sPD–CV_r1) between the single PD counting value CV_sPD and the first reset counting value CV_r1 without an additional calculation.

As described above, the counter 60a may generate a double PD counting value CV_dPD, by sequentially up-counting the first and second double PD sampling signals SS_dPD1 and SS_dPD2. As an example, the counter 60a may generate the double PD counting value CV_dPD, by increasing the counting value by 1 at a time in accordance with the rising edge of the counter clock during the time interval at which the first and second double PD sampling signals SS_dPD1 and SS_dPD2 have the value of 1.

As another example, the counter 60a may generate a double PD digital value DV_dPD, by successively up-counting the first and second double PD sampling signals SS_dPD1 and SS_dPD2 from the second reset counting value CV_r2. In this case, the counter 60a may generate a double PD digital value DV_dPD corresponding to a difference (i.e., CV_dPD–CV_r2) between the double PD counting value CV_dPD and the second reset counting value CV_r2 without an additional calculation.

According to embodiments, the single PD digital value DV_sPD and the double PD digital value DV_dPD that are output from the image sensor may be input to a calculating unit. The calculating unit may multiply the double PD digital value DV_dPD by 1/n to generate the sum data. In addition, the calculating unit may generate difference data, on the basis of a difference between the value obtained by multiplying the double PD digital value DV_dPD by 1/n and the value obtained by doubling the single PD digital value DV_sPD.

The operation of the image sensor according to embodiments will now be described with reference to FIGS. 7, 10, and 11.

Figure 10:
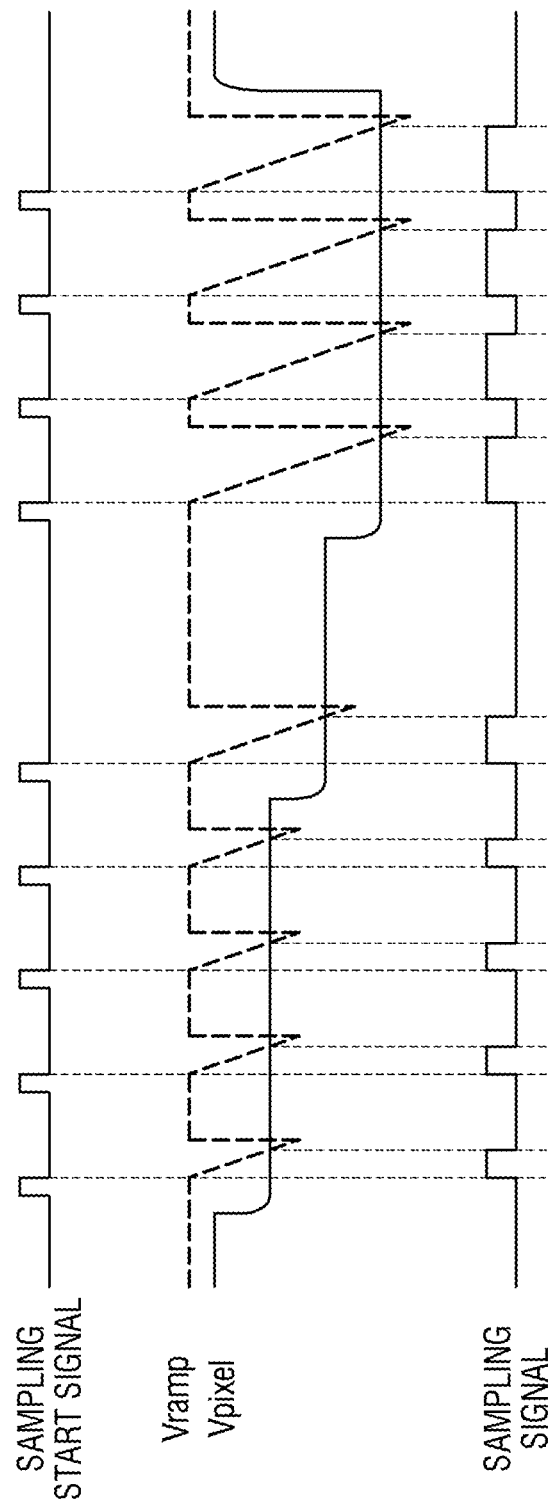
FIG. 10 is a waveform diagram illustrating operation of a sampler according to embodiments.

FIG. 10 is a waveform diagram illustrating operation of a sampler according to embodiments. FIG. 11 is a waveform diagram illustrating operation of a counter according to embodiments. For the sake of convenience of explanation, repeated parts of the above embodiment will be omitted or briefly explained. In FIGS. 10 and 11, the image sensor may operate in a low-noise 4 mode.

Referring to FIG. 10, the timing controller 20 may generate a sampling start signal in accordance with the low-noise 4 mode. For example, the timing controller 20 may generate the four sampling start signals in the reset state (i.e., the section I). Further, the timing controller 20 may generate the one sampling start signal in the single PD state (i.e., the section II). In addition, the timing controller 20 may generate a sampling start signals four times in the double PD state (i.e., the section III).

The sampler 50 may generate the first to fourth reset sampling signals, by sampling the reset output of the pixel signal in accordance with the sampling start signals four times in the reset state (i.e., the section I).

The sampler 50 may generate a single PD sampling signal, by sampling a single PD output of the pixel signal in accordance with the one sampling start signal in the single PD state (i.e., the section II).

The sampler 50 may generate the first to fourth double PD sampling signals, by sampling the single PD output of the pixel signal in accordance with the four sampling start signals in the double PD state (i.e., the section III).

Figure 11:
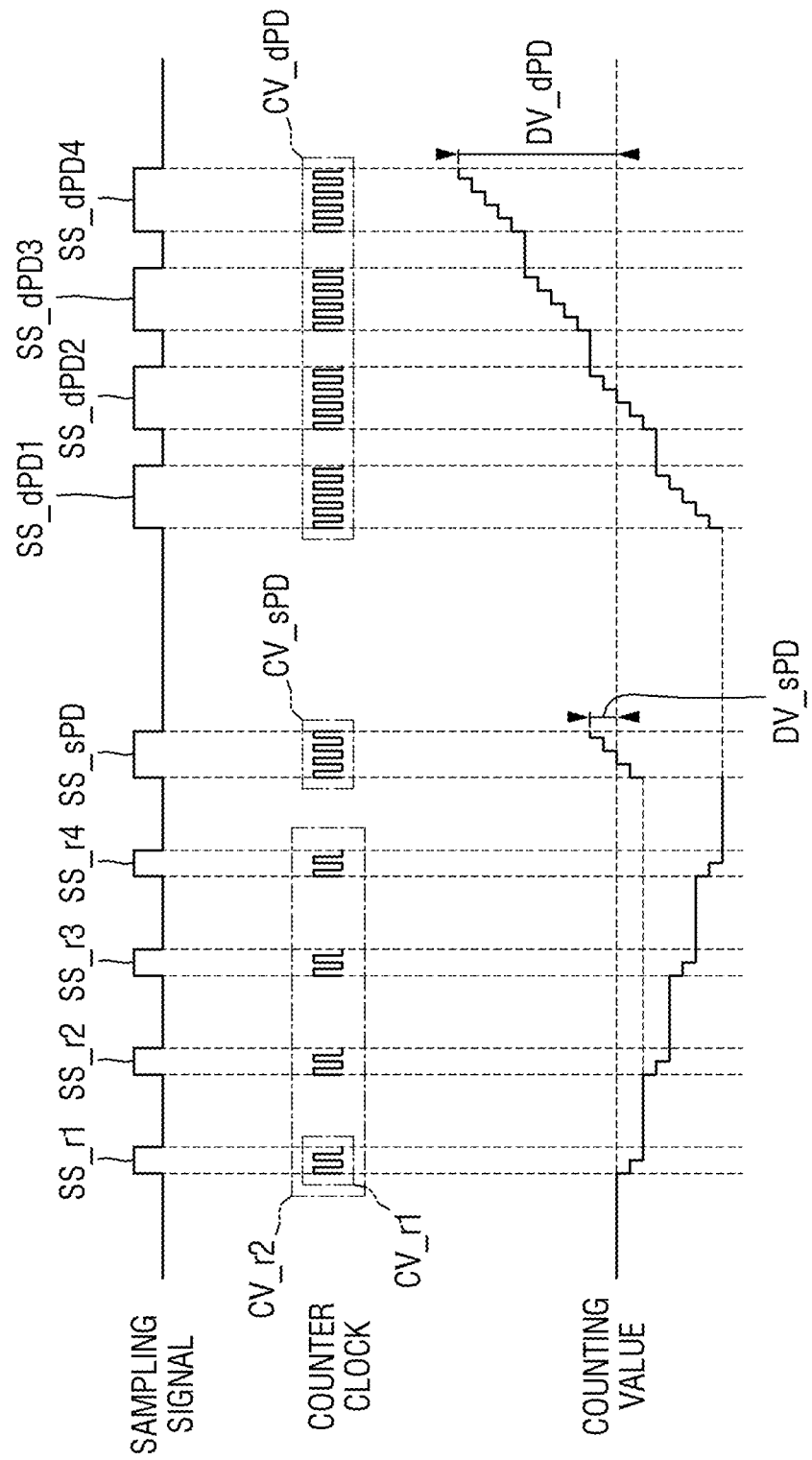
FIG. 11 is a waveform diagram illustrating operation of a counter according to embodiments.

Referring to FIG. 11, the sampling signal includes first to fourth reset sampling signals SS_r1, SS_r2, SS_r3 and SS_r4, a single PD sampling signal SS_sPD, and first to fourth double sampling signals SS_dPD1, SS_dPD2, SS_dPD3 and SS_dPD4.

As described above, the counter 60a may generate the first reset counting value CV_r1 by down-counting the first reset sampling signal SS_r1.

For example, the counter 60a may generate the first reset counting value CV_r1, by decreasing the counting value by 1 at a time in accordance with the rising edge of the counter clock during the time interval at which the first reset sampling signal SS_r1 has the value of 1.

The counter 60a may generate the second reset counting value CV_r2, by sequentially down-counting the first to fourth reset sampling signals SS_r1, SS_r2, SS_r3 and SS_r4. For example, the counter 60a may generate the second reset counting value CV_r2, by decreasing the counting value by 1 at a time in accordance with the rising edge of the counter clock during the time interval at which the first to fourth reset sampling signals SS_r1, SS_r2, SS_r3 and SS_r4 have the value of 1.

As described above, the counter 60a may generate the single PD counting value, by up-counting the single PD sampling signal SS_sPD. As an example, the counter 60a may generate a single PD counting value CV_sPD, by increasing the counting value by 1 at a time in accordance with the rising edge of the counter clock during the time interval at which the single PD sampling signal SS_sPD has the value of 1.

As another example, the counter 60a may generate a single PD digital value DV_sPD, by up-counting the single PD sampling signal SS_sPD from the first reset counting value CV_r1. In this case, the counter 60a may generate the single PD digital value DV_sPD corresponding to the difference (i.e., CV_sPD–CV_r1) between the single PD counting value CV_sPD and the first reset counting value CV_r1 without an additional calculation.

As described above, the counter 60a may generate the double PD counting value CV_dPD, by sequentially up-counting the first to fourth double sampling signals SS_dPD1, SS_dPD2, SS_dPD3 and SS_dPD4.

As an example, the counter 60a may generate a double PD counting value CV_dPD, by increasing the counting value by 1 at a time in accordance with the rising edge of the counter clock during the time interval at which the first to fourth double sampling signals SS_dPD1, SS_dPD2, SS_dPD3 and SS_dPD4 have the value of 1.

As another example, the counter 60a may generate a double PD digital value DV_dPD, by successively up-counting the first to fourth double sampling signals SS_dPD1, SS_dPD2, SS_dPD3 and SS_dPD4 from the second reset counting value CV_r2.

In this case, the counter 60a may generate the double PD digital value DV_dPD corresponding to the difference (i.e., CV_dPD−CV_r2) between the double PD counting value CV_dPD and the second reset counting value CV_r2 without an additional calculation.

In concluding the detailed description, those skilled in the art will appreciate that many variations and modifications may be made to the embodiments without substantially departing from the principles of the disclosure. Therefore, the embodiments of the disclosure are used in a generic and descriptive sense only and not for purposes of limitation.

What is claimed is:

1. An image sensor comprising:
a first photoelectric element; and
a second photoelectric element,
wherein the image sensor is configured to sequentially generate a first reset signal and a first pixel signal in a first mode,
wherein the image sensor is configured to sequentially generate a second reset signal, a third reset signal, a second pixel signal, and a third pixel signal in a second mode different from the first mode, and
wherein the second pixel signal is generated based on the first photoelectric element and the third pixel signal is generated based on the first and second photoelectric elements.

2. The image sensor of claim 1, wherein the image sensor is configured to sequentially generate the second reset signal and the third reset signal in a continuous reset state of the image sensor in the second mode.

3. The image sensor of claim 2, wherein the image sensor is further configured to generate more sampling start signals in a continuous reset state of the image sensor in the second mode than in a continuous reset state of the image sensor in the first mode, and
wherein the first to third reset signals are generated based on respective sampling start signals.

4. The image sensor of claim 3, wherein the image sensor is further configured to generate a first reset counting value by down-counting the second reset signal and count the third reset signal by down-counting the third reset signal from the first reset counting value.

5. The image sensor of claim 4, wherein the image sensor is further configured to generate a second reset counting value by down-counting the third reset signal and count the third pixel signal by up-counting the third pixel signal from the second reset counting value.

6. The image sensor of claim 5, wherein the image sensor is further configured to generate a fourth pixel signal right after generating the third pixel signal in the second mode, and
wherein the fourth pixel signal is generated based on the first and second photoelectric elements.

7. The image sensor of claim 6, wherein the image sensor is further configured to count the fourth pixel signal by up-counting the fourth pixel signal.

8. The image sensor of claim 7, wherein the first and second photoelectric elements are connected to a floating diffusion node.

9. An image sensor comprising a pixel which comprises:
a first photoelectric element; and
a second photoelectric element,
wherein the image sensor is configured to sequentially generate a first reset signal and a first pixel signal in a first mode,
wherein the image sensor is configured to sequentially generate first to N-th second reset signals, first to M-th second pixel signals, and first to L-th third pixel signals in a second mode different from the first mode,
wherein N, M, and L are integers, and N is greater than M, and
wherein the first to M-th first pixel signals are generated based on the first photoelectric element, and the first to L-th second pixel signals are generated based on first and second photoelectric elements.

10. An image sensor comprising:
a first photoelectric element and
a second photoelectric element,
wherein the image sensor is configured to sequentially generate first to N-th reset signals, first to M-th first pixel signals, and first to L-th second pixel signals,
wherein N, M, and L are integers, and N is greater than M,
wherein L is greater than M, and
wherein the image sensor is configured to sequentially generate the first to N-th reset signals in a continuous reset state of the image sensor.

11. The image sensor of claim 10, wherein the first to M-th first pixel signals are generated based on the first photoelectric element.

12. The image sensor of claim 11, wherein the first to L-th second pixel signals are generated based on the first and second photoelectric elements.

13. The image sensor of claim 12, wherein the first and second photoelectric elements are connected to a floating diffusion node.

14. The image sensor of claim 13, wherein the N and L are greater than 1, and
wherein M is 1 such that the first to M-th first pixel signal is one pixel signal.

15. The image sensor of claim 14, wherein N and L are greater than 2.

16. The image sensor of claim 15, wherein N is equal to L.

17. The image sensor of claim 16, wherein N and L are 4.

18. An image sensor comprising:
a first photoelectric element; and
a second photoelectric element,
wherein the image sensor is configured to sequentially generate a first reset signal and a first pixel signal in a first mode,
wherein the image sensor is configured to sequentially generate a second reset signal, a third reset signal, a second pixel signal, a third pixel signal, and a fourth pixel signal in a second mode different from the first mode, and
wherein the second pixel signal is generated based on the first photoelectric element and the third and fourth pixel signals are generated based on the first and second photoelectric elements.

19. The image sensor of claim 18, wherein the image sensor is configured to sequentially generate the second reset signal and the third reset signal in a continuous reset state of the image sensor in the second mode.

20. The image sensor of claim 19, wherein the image sensor is configured to generate a first reset counting value by down-counting the second reset signal and a second reset counting value by down-counting the third reset signal, and
wherein the image sensor is configured to generate a first digital value by up-counting the second pixel signal from the first reset counting value and a second digital value by sequentially up-counting the third pixel signal and fourth pixel signal from the second reset counting value.

\* \* \* \* \*